Figures 1, 2:
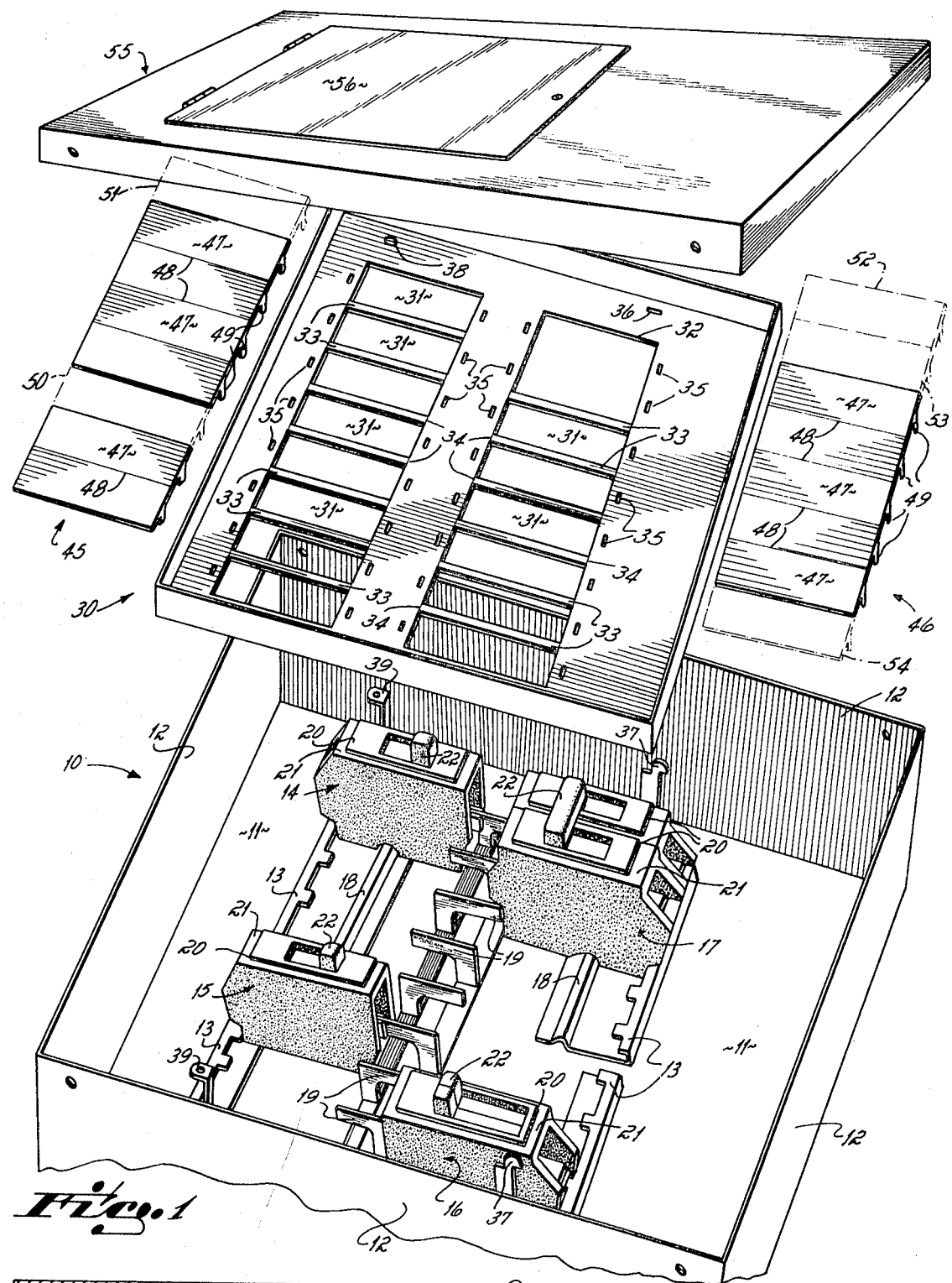

United States Patent [19]
Fritz et al.

[11] 3,743,892
[45] July 3, 1973

[54] CLOSURE MEANS FOR UNOCCUPIED CIRCUIT BREAKER OPENING IN A PANEL BOARD

[75] Inventors: Edward J. Fritz, Florence; William H. Middendorf, Fort Mitchell, both of Ky.

[73] Assignee: The Wadsworth Electric Manufacturing Company, Covington, Ky.

[22] Filed: May 15, 1972

[21] Appl. No.: 253,517

[52] U.S. Cl................ 317/120, 317/119, 220/24.3, 174/67
[51] Int. Cl. ............................................. H02b 1/06
[58] Field of Search.................... 220/24.3, 27, 3.8; 317/112, 117, 119, 120; 174/67, 138 F; 200/168 R

[56] References Cited
UNITED STATES PATENTS

| | | | |
|---|---|---|---|
| 2,767,354 | 10/1956 | Jackson | 317/120 |
| 3,218,519 | 11/1965 | Casey | 317/120 |
| 3,469,149 | 9/1969 | Paape | 317/120 |
| 3,339,124 | 8/1967 | Jorgensen | 317/120 |
| 3,461,349 | 8/1969 | Meyer | 317/120 |
| 3,278,066 | 10/1966 | George | 220/24.3 |

Primary Examiner—Robert K. Schaefer
Assistant Examiner—Gerald P. Tolin
Attorney—James S. Hight, David S. Stallard et al.

[57] ABSTRACT

A circuit breaker enclosure is provided with a dead front panel having openings corresponding to possible circuit breaker positions. A segmented filler plate comprises a plurality of separable segments, each being of greater dimension than the openings in the dead front. Individual ones of the segments or any combination thereof are separated from the filler plate and are positively secured over respective dead front openings which are not occupied by a circuit breaker. The combination of the occupying breakers and the secured segments of the filler plate cooperate to effectively seal the dead front and thus the enclosure.

11 Claims, 2 Drawing Figures

Patented July 3, 1973 3,743,892

CLOSURE MEANS FOR UNOCCUPIED CIRCUIT BREAKER OPENING IN A PANEL BOARD

This invention relates to circuit breaker enclosures. More particularly the invention relates to a dead front panel and cooperating filler plate for providing closures over breaker receiving openings in the dead front of a circuit breaker enclosure.

It has been a common practice for electricians to assemble circuit breakers to an appropriate enclosure in the field. In a normal installation, an electrician will mount an enclosure and then select and insert circuit breakers of appropriate rating in desired positions. A dead front with an opening for each possible breaker position is then placed over the connected breakers. Since less than a full complement of breakers may be used, all available opening positions may not be occupied by breakers.

In order to render such enclosures acceptable for safe secure use, it is necessary to insure that there are no direct openings from the interior of the enclosure through the dead front. In the event of a short circuit or electrical fire, for instance, a direct opening would allow sparks, flames and gases to the exterior of the enclosure, thereby creating a greater potential danger. It thus becomes necessary to provide a dead front with a means for covering any openings not occupied by a breaker.

The typical circuit breaker enclosure now in use includes a box-like structure with an open front. Circuit breakers are mounted in the enclosure in selected positions. A dead front is placed over the open front of the enclosure, the dead front having openings corresponding to the mounted breakers' positions. A panel having a hinged door is then placed over the dead front to secure the enclosure. The door provides access to the dead front and the mounted breakers which protrude through the openings in the dead front.

The present invention is directed to a dead front structure by which openings can be created in selected positions corresponding to circuit breaker positions, while sealing the remainder of the dead front area as completely as possible.

The prior art shows several approaches to the dead front structure. In one form a dead front has a plurality of "knock-out" areas formed in it corresponding to circuit breaker positions. The knock-outs in a particular position are removed by the electrician when he installs a breaker in that position. This design has the disadvantage of requiring the electrician to separately remove up to forty-two knock-outs when installing a panel. Further, the knock-outs each have a hole to receive a screwdriver by which they are removed, and these holes reduce the sealed integrity of the dead front. In addition, some knock-out configurations require utilization of a metal of heavier gage than that normally used, and the heavier dead fronts are thus more expensive.

Another method has been to provide a dead front with openings corresponding to all circuit breaker positions, the unoccupied openings in a dead front being closed by individual cup-shaped filler plates, frictionally fitted in the openings. Underwriters requires that the walls of these plates be at least one-quarter inch deep to reduce the effluence of gas and molten metal, should a short occur. This method has several disadvantages. For example, these thickened fillers are expensive, and they require close tolerances to maintain their friction fit on the dead front. They also required individual insertion into each unoccupied opening.

A still further system which has been utilized is shown in U. S. Pat. No. 2,767,354. In this patent, a dead front has a single longitudinal slot through which breakers may extend. A scored filler plate is slidingly mounted to the panel by way of outboard tabs engaging the panel's edges. The plate may be adjusted to accommodate varying numbers of breakers, however, the plate has no elements for securing selected segments thereof in selected positions. Should so many breakers be used so that the sliding plate would project beyond the upper wall of the enclosure, the projecting portion of the plate is broken off along an appropriate score line.

This patent apparently implies that it is limited to the placement of circuit breakers within a contiguous group since it shows no convenient means for mounting filler plate segments between circuit breakers. Furthermore, it is not apparent from the patent that the device will provide the required security against gases and flame passing between the dead front and filler plate.

It has thus been a primary objective of the invention to provide a circuit breaker enclosure with a dead front panel and a filler plate therefor, the dead front panel and filler plate cooperating to provide a secure enclosure for a plurality of single or multi-pole circuit breakers in any combination of positions and also minimizing the installation time in covering unoccupied openings.

To this end, we provide a dead front panel for a circuit breaker enclosure, wherein the dead front comprises a full complement of breaker-receiving openings defined by straps between each opening. A small tab-receiving opening is located at each end of each breaker opening. A filler plate is provided as an integral plate of a size to cover all adjacent openings. The plate is delineated by scores which enable individual segments to be broken away from the others, and each segment has tabs which are positioned to project through the tab-receiving openings. These tabs can be bent over to secure the filler plate or any portion of it to the dead front so that the plate covers the openings. Each segment is slightly larger in dimension than the opening which it covers, thereby creating a tortuous path tending to block or to retard the passage of flame or gas through the dead front. The segments may be broken away from the filler plate single or in selected multiples and can be attached to the dead front in order to cover single or multiple unoccupied openings therein.

The straps separating the openings are scored at each end in order to facilitate removal when a multi-pole breaker is to be utilized. In the event that a strap is inadvertently removed, or that a multi-pole breaker is removed, a plurality of integral segments can be placed over the now large opening. The opening is thereby completely covered regardless of whether or not the various straps separating the covered openings have been removed.

The dead front panel and filler plate of the invention thus have the advantage of providing a tortuous path limiting the effluence of any flames or gas due to a short or the like. In addition, the separable, securable filler plates allow random placement of a variety of circuit breakers while minimizing the number of individual filler plates required.

These and other objects and advantages of the invention will become readily apparent to one of ordinary skill in the art upon review of the following detailed specification of the drawings in which:

FIG. 1 is an exploded view of a circuit breaker enclosure showing selected circuit breakers in mounted position, the dead front and cooperating filler plates and a front panel with an access door, and FIG. 2 is a cross section showing the relative assembled positions of certain mounted circuit breakers, the dead front, filler plates and the covering panel and access door.

Referring now to the drawings, in FIG. 1, there is shown a circuit breaker enclosure comprising a housing 10. The housing 10 has a back wall 11 and side walls 12, the front of the housing being open. Secured to the back wall 11 are elements 13 which may be of any known variety for mounting circuit breakers 14 through 17 thereon. The mounting elements 13 may be provided with ribs 18 which allow only circuit breakers of a certain type to be installed within the housing. The ribs are formed to discriminate, for example, between a one-inch wide single-pole breaker and a double single-pole one inch wide breaker. Stabs 19 are provided for electrically connecting the circuit breakers within particular circuits. Each of the circuit breakers 14–17 has a projection 20 which projects above the main body of the circuit breaker, leaving a ledge or shoulder 21 extending around and just below the projection 20.

Each circuit breaker also includes a switch-activating member 22 which extends outwardly from the circuit breaker through the projections 20. It will be noted that the circuit breakers 14, 15 and 16 are typical single pole circuit breakers while circuit breaker 17 is a double-pole or multi-pole circuit breaker. While the housing 10 includes means to mount a full complement of circuit breakers, only a few circuit breakers, and less than a full complement are shown in the drawing.

A dead front panel 30 is provided for covering the forward open area of the housing 10 were various circuit breakers are positioned. The dead front 30 includes a plurality of openings 31 which are positioned in the dead front in positions corresponding to possible breaker positions in the housing 10. Shown in FIG. 1, all of the openings 31 are similar in dimension. The dead front also has an opening 32 which is approximately the size of two normal openings 31. As will be explained, this larger opening will accommodate a multi-pole circuit breaker.

Each of the openings is defined in the dead front by straps 33. These straps are scored at their ends 34 where they join the main body of the dead front. The purpose of these scores is to allow the straps to be removed in the event that a multi-pole circuit breaker is used in the position of the enclosure corresponding to the position of the opening in the dead front. Opening 32 illustrates an opening wherein the strap between original adjacent openings 31 has been removed. This larger opening 32 thus accommodates the multi-pole circuit breaker 17.

Adjacent each end of the opening 31 are small tab openings 35. In addition to these tab openings, the dead front is provided with further openings for mounting it on the circuit breaker enclosure. Slots 36 (lower slot not shown) receive tabs 37 extending from the back wall 11 of the enclosure. The dead front is then secured through openings 38 (lower openings not shown) to posts 39 and in a secured position overlies all of the mounted circuit breakers.

It will be noted at this point that the projections 20 of each of the mounted circuit breakers extend through the respective openings 31 and 32 which correspond to the positions of the mounted circuit breakers. The straps 33 and the dead front itself serve to cover the ledges 21 which surround the projections 20 of the circuit breakers. This feature is best seen in FIG. 2, showing the dead front in position over circuit breakers 14 and 15. It can be seen that the straps 33 cover the ledge portion 21 of the circuit breakers 14 and 15; however, the projections 20 of the circuit breakers extend through the openings between the straps. The dead front itself covers the upper (right) portion of the ledge 21 of circuit breaker 14, and the strap 33 adjacent breaker 14 covers the lower (left) portion of the ledge 21 of that breaker.

The cooperation of the straps and the dead front with the projecting portion 20 and the ledge 21 of each circuit breaker provides a tortuous path between the area in front of the dead front and the area behind the dead front where the circuit breakers are mounted. Thus, in those positions where a circuit breaker is mounted, no direct openings are provided between the front and the rear of the dead front. It should be noted that the shorter portions of the ledge 21 on each end of the mounted circuit breakers are long enough so as to cover the tab openings 35 which are adjacent the ends of each opening. Thus, there is no direct path at the circuit breaker positions between the front and the rear of the dead front.

In order to secure and cover those openings in which a circuit breaker is not mounted, filler plates 45 and 46 are provided. Each plate 45 and 46 comprises a plurality of segments 47, these segments being defined by score lines 48. Each of the segments is provided with a tab 49 at each end thereof. The score lines 48 are provided such that individual segments may be broken away from the filler plates 45 and 46.

In FIG. 1 certain segments of each filler plate have been broken away to accommodate installed breakers. For instance, in plate 45 segments 50 and 51 are indicated by phantom lines indicating that these two segments have been broken away from the plate. In plate 46 segments 52, 53 and 54 are indicated in phantom lines, these segments having been broken away from the plate. In this manner, the plates are prepared for use to cover unoccupied openings in the dead front.

It will be noted that circuit breaker 14 occupies a position in breaker enclosure 10 corresponding to the uppermost opening on the left hand side of the dead front 30. Thus, segment 51 must be broken away from plate 45 in order to allow the circuit breaker to extend through the opening. In a like manner, circuit breaker 15 is in the third position from the bottom in the enclosure, which position corresponds to the same respective opening on the left hand side of the dead front. Thus segment 50 must be broken away from the plate 45.

Circuit breaker 16 occupies the bottommost position on the right hand side of the breaker enclosure as shown in FIG. 1 and thus segment 54 has been broken away from plate 46 to allow the breaker to extend through the bottommost opening on the right hand side of the dead front. The multi-pole breaker 17 is located in the uppermost position of the enclosure on its right hand side. Since this is a multi-pole breaker, a strap originally defining two adjacent openings 31 has been removed between its end score lines so as to provide the larger opening 32 which allows a multi-pole circuit breaker to extend therethrough. The strap originally located in opening 32 is not necessary since the ledge portion 21 of the multi-pole circuit breaker 17 now fills up the area normally covered by the strap. To accommodate the multi-pole circuit breaker in the dead front, segments 52 and 53 have been removed from the filler plate 46.

Of course, the foregoing description is only one example of a combination of certain segments 47 and openings 31. It should be understood that none of the segments in the plates 45 and 46 are peculiar to any opening 31 and in fact, any segment 47 fits any opening 31.

In order to completely cover the front of the circuit breaker enclosure 10, a panel 55 is provided. This panel includes an access opening and a hinged door 56 which may be opened to allow access to the breakers extending through the dead front. It will be noted that the dead front 30 is of larger dimensions than the opening provided in the panel 55, thereby further insuring that no direct path leads from the exterior to the interior of the housing 10.

When installing the circuit breaker enclosure and dead front of this invention, circuit breakers of the proper rating are selected and are mounted by way of the elements 13 on the back wall 11 of the housing. The circuit breakers may be positioned in any selected order as desired by the electrician. After the circuit breakers have been installed, the electrician notes which openings of the dead front will have to remain open in order to allow projection therethrough of a circuit breaker. At these positions, he breaks off or removes various segments, in this case segments 50 and 51 from the plate 45 and segments 52–54 of the plate 46. The remaining segments are placed over the openings 31 in the dead front with the tabs 49 extending through the tab openings 35. These tabs may then be twisted or bent to secure the filler plates in position over the various unoccupied openings. In the event that a number of joined segments constitute a plate to cover adjacent openings, such a plate can be secured to the dead front by twisting or bending only the tabs of the end segments after they are positioned in the proper openings.

Since the segments are somewhat larger than the dimension of the opening in the dead front, the segments cover the openings and thereby provide a tortuous path for any gas or flames that might attempt to exit therethrough. The tabs 49 fill each of the tab openings 35 adjacent the covered openings and prohibit gas or flame from exiting directly therethrough.

Where multi-pole circuit breakers, such as breaker 17 are used, the electrician may remove the appropriate strap 33 to provide a larger opening for the multi-pole breaker. This is illustrated on plate 46 by the removal of the segments 52 and 53 therefrom. Of course, the electrician may select any combination of single or plural segments 47 to cover unoccupied openings as desired.

It can thus be appreciated that this invention provides an electrician with a means to selectively install circuit breakers at any desired position and to quickly and easily cover all unoccupied openings in the dead front. In the circumstance where adjacent openings are unoccupied, each opening is not separately closed, but the electrician merely installs a plate comprising the number of segments corresponding to the number of unoccupied openings. In the situation where there is a single unoccupied opening between two circuit breakers, the electrician may install a single segment over that opening. The tabs 49 provide a means to positively secure the segment over that opening and do not rely on a frictional fit or abutting surfaces of the adjacent circuit breakers for support. The electrician then installs the dead front over the various circuit breakers and secures the panel 55 and door 56 to the housing 10.

The invention thus provides a dead front and a filler plate comprising a plurality of separable segments, each having means for securing it individually or in combination with other segments to the dead front. The breaker receiving openings are of smaller dimension than an abutting portion of the main body of the breaker and cooperate with a ledge surrounding a projection of the breaker in order to provide only a tortuous path between the front and back of the dead front. Segments of the filler plates are placed over unoccupied openings in the dead front and overlie a portion of the straps 33 and the main body of the dead front in order to provide only tortuous paths between the front and back of the dead front. Furthermore, it should be noted that the invention may be used as well in enclosures that do not utilize a hinged door and dead front but rather are constructed so that the breakers extend through openings in an integral panel or lid.

It can also readily be observed that the filler plates with the separable segments substantially reduce installation time in covering unoccupied openings.

While one embodiment of the invention has been particularly described, alterations and modifications can well be appreciated by those of ordinary skill in the art without departing from the scope of the invention; and I intend to be bound only by the appended claims.

I claim:

1. Circuit breaker enclosure apparatus comprising, means for enclosing a plurality of circuit breakers and having an open forward side,
panel means for closing said forward side and having a plurality of openings for receiving circuit breakers positioned within said enclosure, each of said openings being defined by straps therebetween and being smaller than a circuit breaker,
integral filler plate means for covering selected openings and comprising a plurality of separable segments removably joined edge to edge, each segment being slightly larger than an opening, and
means on each of said segments for positively attaching each segment directly to said panel means in a selected position over one of said selected openings, said filler plate means covering selected openings at any position without separating the segments covering adjacent openings, thereby providing a tortuous path for hot gas or flame from one side of said panel means to another.

2. Apparatus as in claim 1 including a plurality of circuit breakers extending through selected openings in said panel means, and unoccupied openings through which no circuit breakers extend, and wherein said integral filler plate means includes a plurality of filler plates, some of which comprise varying numbers of said segments, covering each of said unoccupied openings.

3. Apparatus as in claim 1 wherein said straps are scored to facilitate removal thereof in order to accommodate multi-pole circuit breakers.

4. Apparatus as in claim 1 including tab openings at each end of each of said openings of said plurality of openings and wherein said securing means includes tabs on respective ends of each of said segments for cooperating with said tab openings to secure said segments to said panel means.

5. Apparatus as in claim 1 wherein said segments are separable in selected numbers from said integral filler plate means.

6. Apparatus as in claim 1 including at least one circuit breaker having a first body portion structured to extend through at least one of said openings, and a second body portion of greater dimension than the opening and positioned adjacent said dead front in order to provide a tortuous path from one side of said panel means to another.

7. Apparatus as in claim 1 including
at least one circuit breaker positioned in at least one opening, said circuit breaker having a body, and
wherein said straps defining said opening overlaps one portion of said body.

8. Apparatus as in claim 7 wherein said panel means overlaps other portions of said body.

9. Apparatus as in claim 4 wherein said integral filler plate means and said tabs cover and fill respectively said breaker-receiving openings and said tab openings.

10. Apparatus as in claim 1 wherein said integral filler plate means comprises at least three segments and wherein said filler plate is attached over at least three adjacent openings in said panel by the securing means on only the end segments of the filler plate means.

11. In a circuit breaker enclosure apparatus of the type having a housing with means for mounting a full complement of circuit breakers,
a panel means positioned over a normally open portion of asid housing and having a like full complement of corresponding breaker receiving openings defined by removably mounted straps,
a plurality of circuit breakers partially extending through corresponding openings, said plurality being less than a full complement,
unoccupied openings through which no circuit breakers extend,
integral filler plate means for covering said unoccupied openings and comprising a plurality of separable segments, removably joined edge to edge, each segment being of slightly greater dimension than one of said openings, and
means on each of said segments for positively attaching each segment to said panel means in a selected position over one of said unoccupied openings.

* * * * *